July 19, 1932.  W. LEIDEL  1,868,289

SPOON

Filed May 22, 1930

Inventor
*William Leidel*
By his Attorney

Patented July 19, 1932

1,868,289

UNITED STATES PATENT OFFICE

WILLIAM LEIDEL, OF ELMHURST, NEW YORK

SPOON

Application filed May 22, 1930. Serial No. 454,656.

This invention relates to improvement in spoons, and more particularly to spoons for individual use for eating purposes.

Among the principal objects the invention has in view are: to provide an improved spoon having a cutting edge; to provide a spoon by which corn may be cut; to provide a cutting edge on a spoon whereby rows of kernels may be cut and simultaneously picked up; to secure simplicity of construction and operation; and to obtain other advantages and results as may be brought out in the following description.

Figure 1:
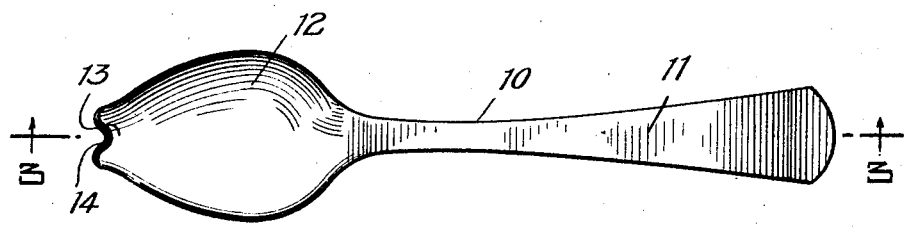
Figure 1 is a plan view of a spoon embodying the invention.
Figure 2:
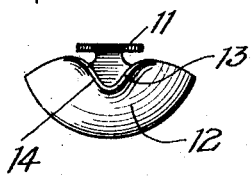
Figure 2 is an end view looking toward the bowl end of the spoon.
Figure 3:
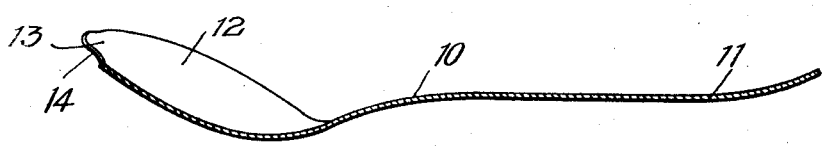
Figure 3 is a sectional view as taken on line 3—3 of Figure 1.

In the specification:

In the specific embodiment of the invention illustrated in the said drawing, and referring to Figures 1, 2, and 3, the reference numeral 10 indicates a spoon in general, having a handle 11 and a bowl 12.

Heretofore, the kernels of corn on the cob have been removed direct by biting the same, or by applying a sharp instrument and cutting the kernels from the cob, after which the kernels have been eaten with another instrument. In this invention I have devised means for more readily and conveniently removing the kernels and simultaneously depositing them within the bowl of the spoon from which they may be immediately eaten if so desired. Said means are preferably in the forward end of the bowl 12, and is shown formed by cutting away the edge to form a concave portion or notch 13, said notch having a cutting edge 14 at the bottom face of the bowl.

In carrying out the invention, the concave portion 13 is preferably flared out slightly, and in so doing permits the spoon 10 to be run along one row of kernels at a time, cutting each kernel next the cob, and as each kernel is thus released from the cob, it drops into the bowl 12 of the spoon 10.

However, it is to be understood that while the rows of kernels may be removed in one continuous operation of the cutting edge 14, the kernels may likewise be removed a few at a time by simply applying the cutting edge underneath kernels until the bowl of the spoon is sufficiently filled.

Figure 4:
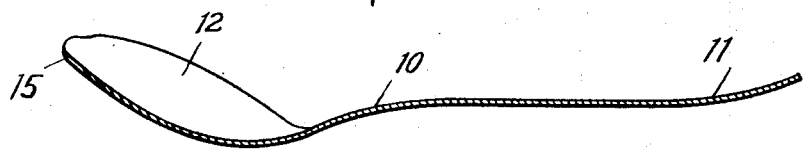
Figure 4 is a view similar to Figure 3 in modified form.

While I have described my invention as providing the cutting edge at the bottom face of the bowl, this may be varied if found desirable to place otherwise. By way of example, in Figure 4, I provide a similar cutting edge 15 on the spoon 10, but in this instance, the keen, or sharp edge is at the upper concave portion or notch 13 of surface of the bowl 12. This is preferable when the spoon is to be used at a sharp angle to the cob, thereby permitting greater accessibility to cut and pick up the kernels from the cob.

I claim:

A spoon as characterized comprising a handle at one end, a bowl at the other end, said bowl being shaped at its forward end to substantially fit within a single row of corn on the cob, and the walls of said concave portion being flared outward and rounded to rest on adjacent rows of kernels, said concave portion being provided with a sharp edge adapted to remove the kernels from said cob without digging into and removing an unedible part of the cob.

WILLIAM LEIDEL.